US011295343B1

(12) United States Patent
Gómez-Rosado

(10) Patent No.: US 11,295,343 B1
(45) Date of Patent: Apr. 5, 2022

(54) SYSTEM AND APPARATUS FOR SELF-FORMING AD-HOC GROUP PROMOTIONS

(71) Applicant: GROUPON, INC., Chicago, IL (US)

(72) Inventor: David Gómez-Rosado, Petaluma, CA (US)

(73) Assignee: GROUPON, INC., Chicago, IL (US)

( * ) Notice: Subject to any disclaimer, the term of this patent is extended or adjusted under 35 U.S.C. 154(b) by 348 days.

(21) Appl. No.: 14/983,671

(22) Filed: Dec. 30, 2015

Related U.S. Application Data

(60) Provisional application No. 62/097,639, filed on Dec. 30, 2014.

(51) Int. Cl.
*G06Q 30/02* (2012.01)

(52) U.S. Cl.
CPC ..... *G06Q 30/0267* (2013.01); *G06Q 30/0255* (2013.01); *G06Q 30/0261* (2013.01)

(58) Field of Classification Search
CPC ................................ G06Q 30/0207–30/0277
USPC ...................................... 705/14, 319
See application file for complete search history.

(56) References Cited

U.S. PATENT DOCUMENTS

| 2012/0185335 A1* | 7/2012 | Tsirtsis ............... G06Q 30/0267 705/14.64 |
| 2014/0214950 A1* | 7/2014 | Mallet ................... G06Q 50/01 709/204 |
| 2014/0379477 A1* | 12/2014 | Sheinfeld ........... G06Q 30/0251 705/14.58 |
| 2015/0141067 A1* | 5/2015 | Chien .................... H04W 8/186 455/519 |
| 2015/0262245 A1* | 9/2015 | Arvanitis ............... G06Q 30/02 705/14.35 |
| 2016/0169696 A1* | 6/2016 | Butts, III ........... G01C 21/3476 701/438 |
| 2016/0253710 A1* | 9/2016 | Publicover .............. H04W 4/21 705/14.66 |

FOREIGN PATENT DOCUMENTS

WO   WO-2015048338 A1 *   4/2015   ............. H04W 4/21

* cited by examiner

*Primary Examiner* — David J Stoltenberg
*Assistant Examiner* — Richard G Reinhardt
(74) *Attorney, Agent, or Firm* — Alston & Bird LLP

(57) ABSTRACT

A method, apparatus, and computer program product are disclosed for automatically generating group promotions. An example apparatus includes context collection circuitry configured to collect contextual data, and group identification circuitry configured to identify an ad-hoc group of consumer devices based on the collected contextual data. The example apparatus further includes a processor configured to determine a group intention associated with the ad-hoc group of consumer devices, and communications circuitry configured to broadcast a group promotion request based on the ad-hoc group of consumer devices and the group intention.

36 Claims, 7 Drawing Sheets

SYSTEM AND APPARATUS FOR SELF-FORMING AD-HOC GROUP PROMOTIONS

CROSS-REFERENCE TO RELATED APPLICATIONS

This application claims the benefit of U.S. Provisional Patent Application No. 62/097,639, filed Dec. 30, 2014, the entire contents of which are incorporated herein by reference.

TECHNOLOGICAL FIELD

Example embodiments of the present invention relate generally to wireless device interoperability and, more particularly, to a system and method by which wireless devices form into ad-hoc groups.

BACKGROUND

Applicant has discovered problems with existing mechanisms for merchant outreach by promotion and marketing services. Through applied effort, ingenuity, and innovation, Applicant has solved many of these identified problems by developing a solution that is embodied by the present invention and described in detail below.

BRIEF SUMMARY

A system is provided that improve upon existing mechanisms for matching consumers with relevant opportunities by a promotion and marketing service. In an example embodiment, a consumer device is designed to automatically interact with other consumer devices (or with a server in some embodiments) to identify and establish an ad-hoc group and a corresponding group intention. Using this information, relevant promotions can thereafter be provided to the ad-hoc group that, due to their specificity, may be more likely to be purchased by the consumers of the ad-hoc group.

In a first example embodiment, an apparatus is provided. The apparatus includes context collection circuitry configured to collect contextual data, and group identification circuitry configured to identify an ad-hoc group of consumer devices based on the collected contextual data. The apparatus further includes a processor configured to determine a group intention associated with the ad-hoc group of consumer devices, and communications circuitry configured to broadcast a group promotion request based on the ad-hoc group of consumer devices and the group intention.

In some embodiments, the communications circuitry is further configured to receive one or more messages from one or more merchants in response to broadcasting the group promotion request, wherein each of the one or more messages comprises an offer to redeem a group promotion at a merchant location associated with at least one of the one or more merchants. In one example embodiment, the processor may be further configured to purchase a group promotion identified by one of the one or more messages. The communications circuitry may be further configured to redeem the group promotion. In this case, redeeming the group promotion may include receiving an indication that payment of a portion of the group promotion owed by a consumer associated with the consumer device has been debited from an account associated with the consumer.

In some embodiments, collecting the contextual data includes capturing, by sensors controlled by the consumer device, location data, velocity data, acceleration data, data identifying a direction-of-travel of the consumer device, gyroscopic data, temperature data, humidity data, brightness data, gravitational data, orientation data, proximity data, or audio data. Additionally or alternatively, the communications circuitry may be further configured to receive signals from other consumer devices, wherein collecting the contextual data includes identifying distances between the consumer device and the other consumer devices. In one such instance, the processor may be further configured to retrieve historical information regarding the other consumer devices, wherein the contextual data includes the information regarding the other consumer devices. Additionally or alternatively, collecting the contextual data may include receiving contextual data from the other consumer devices.

In some embodiments, identifying the ad-hoc group of consumer devices includes identifying, from the contextual data, a first set of consumer devices, wherein the first set of consumer devices comprise consumer devices within a predetermined distance of the consumer device, and wherein the ad-hoc group of consumer devices includes the consumer device and consumer devices from the set of consumer devices. In one such embodiment, the communications circuitry is further configured to retrieve, based on the contextual data, a direction of travel of the consumer device and directions of travel of each consumer device in the first set of consumer devices, wherein the ad-hoc group of consumer devices excludes consumer devices from the first set that do not have a similar direction-of-travel as the consumer device. In another such embodiment, identifying the ad-hoc group of consumer devices includes retrieving, based on the contextual data, historical information regarding the consumer device and each consumer device in the first set of consumer devices, and identifying, based on the historical information regarding the consumer device and the historical information regarding each consumer device in the first set of consumer devices, consumer devices in the first set of consumer devices having similar purchasing patterns as the consumer device, wherein the ad-hoc group of consumer devices excludes consumer devices from the first set of consumer devices that do not have similar historical purchasing patterns.

In one embodiment, determining the group intention associated with the ad-hoc group is based on the contextual data. In this regard, determining the group intention associated with the ad-hoc group may be further based on at least one of environmental indicators or historical information.

In a second example embodiment, a method is provided. The method includes collecting, by a consumer device, contextual data, identifying, by the consumer device and based on the collected contextual data, an ad-hoc group of consumer devices, determining a group intention associated with the ad-hoc group of consumer devices, and broadcasting a group promotion request based on the ad-hoc group of consumer devices and the group intention.

In a third example embodiment, an apparatus is provided. The apparatus includes means for collecting contextual data, means for identifying, based on the collected contextual data, an ad-hoc group of consumer devices, means for determining a group intention associated with the ad-hoc group of consumer devices, and means for broadcasting a group promotion request based on the ad-hoc group of consumer devices and the group intention.

In a fourth example embodiment, a computer program product is provided. The computer program product includes at least one non-transitory computer-readable storage medium having computer-readable program instructions embodied therein that, when executed by a processor, causes an apparatus to collect contextual data, identify, based on the collected contextual data, an ad-hoc group of consumer devices, determine a group intention associated with the ad-hoc group of consumer devices, and broadcast a group promotion request based on the ad-hoc group of consumer devices and the group intention.

In a fifth example embodiment, an apparatus is provided. The apparatus includes communications circuitry configured to receive a group promotion request from an ad-hoc group of consumer devices, and a processor configured to retrieve yield management information and evaluate the yield management information based on the group promotion request. The apparatus further includes promotion design circuitry configured to design a group promotion based on the group promotion request and the evaluation of the yield management information.

In some embodiments, the communications circuitry is further configured to transmit a message including an offer of a group promotion. In some such embodiments, the communications circuitry is further configured to receive an indication that the ad-hoc group of consumer devices purchased the group promotion. In one such embodiment, the processor is further configured to facilitate redemption of the group promotion. In this regard, facilitating redemption of the group promotion may include debiting accounts associated with the consumer devices in the ad-hoc group of consumer devices, and transmitting a message to each consumer device in the ad-hoc group of consumer devices, the message indicating that payment of a portion of the group promotion owed by a consumer associated with the consumer device has been debited from an account associated with the consumer.

In some embodiments, evaluating the yield management information includes determining whether sufficient capacity exists to accommodate a number of consumers identified by the ad-hoc group of consumer devices. In some embodiments, designing the group promotion based on the group promotion request and the evaluation of the yield management information includes determining a number of consumers identified by the ad-hoc group of consumer devices, and selecting a predefined promotion based on a comparison of the number of consumers identified by the ad-hoc group of consumer devices to stored predetermined promotion thresholds.

In a sixth example embodiment, a method is provided. The method includes receiving, by a merchant device, a group promotion request from an ad-hoc group of consumer devices, retrieving yield management information, evaluating the yield management information based on the group promotion request, and designing a group promotion based on the group promotion request and the evaluation of the yield management information.

In a seventh example embodiment, an apparatus is provided. The apparatus includes means for receiving, by a merchant device, a group promotion request from an ad-hoc group of consumer devices, retrieving yield management information, means for evaluating the yield management information based on the group promotion request, and means for designing a group promotion based on the group promotion request and the evaluation of the yield management information.

In an eighth example embodiment, a computer program product is provided. The computer program product includes at least one non-transitory computer-readable storage medium having computer-readable program instructions embodied therein that, when executed by a processor, causes an apparatus to receive, by a merchant device, a group promotion request from an ad-hoc group of consumer devices, retrieve yield management information, evaluate the yield management information based on the group promotion request, and design a group promotion based on the group promotion request and the evaluation of the yield management information.

In a ninth example embodiment, an apparatus is provided. The apparatus includes contextual collection circuitry configured to collect contextual data from a plurality of consumer devices, and group identification circuitry configured to identify, based on the collected contextual data, an ad-hoc group of consumer devices. The apparatus further includes a processor configured to determine a group intention associated with the ad-hoc group of consumer devices, and identify relevant merchants based on identification of the ad-hoc group of consumer devices and the group intention.

In some embodiments, the processor may be further configured to determine whether the apparatus should generate group promotions on behalf of the relevant merchants. In some such embodiments, the apparatus may further include communications circuitry configured to, in an instance in which it is determined that the apparatus should not generate group promotions on behalf of the relevant merchants, transmit a group promotion request to the relevant merchants. In this regard, the communications circuitry may be further configured to facilitate redemption of the purchased group promotion. In other such embodiments, the processor may be further configured to, in an instance in which the processor determines that the apparatus should generate group promotions on behalf of the relevant merchants, evaluate the yield management information for each of the relevant merchants based on the group promotion request; and design one or more group promotions for a subset of the relevant merchants based on the group intention and the evaluations of the yield management information for each of the relevant merchants. In this regard, the apparatus may further include communications circuitry configured to transmit messages including offers of group promotions on behalf of the subset of the relevant merchants. To this end, the communications circuitry may be further configured to receive a request to purchase one of the group promotions from a consumer device in the ad-hoc group of consumer devices. Additionally, the communications circuitry may be further configured to facilitate redemption of the purchased group promotion.

In a tenth example embodiment, a method is provided. The method includes collecting, by a server, contextual data from a plurality of consumer devices, identifying, by the server and based on the collected contextual data, an ad-hoc group of consumer devices, determining, by the server, a group intention associated with the ad-hoc group of consumer devices, and identifying relevant merchants based on identification of the ad-hoc group of consumer devices and the group intention.

In an eleventh example embodiment, an apparatus is provided. The apparatus includes means for collecting contextual data from a plurality of consumer devices, means for identifying, based on the collected contextual data, an ad-hoc group of consumer devices, means for determining a group intention associated with the ad-hoc group of consumer devices, and means for identifying relevant merchants based on identification of the ad-hoc group of consumer devices and the group intention.

In a twelve example embodiment, a computer program product is provided. The computer program product includes at least one non-transitory computer-readable storage medium having computer-readable program instructions embodied therein that, when executed by a processor, causes an apparatus to collect contextual data from a plurality of consumer devices, identify, based on the collected contextual data, an ad-hoc group of consumer devices, determine a group intention associated with the ad-hoc group of consumer devices, and identify relevant merchants based on identification of the ad-hoc group of consumer devices and the group intention.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
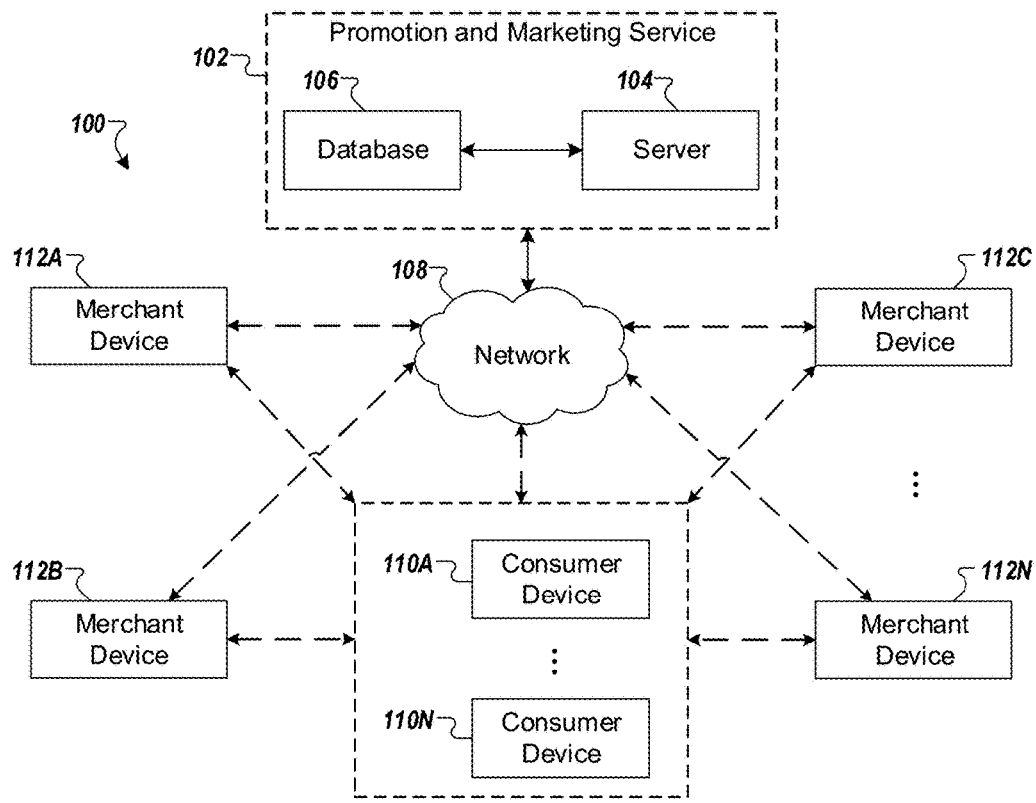
Figure 2A:
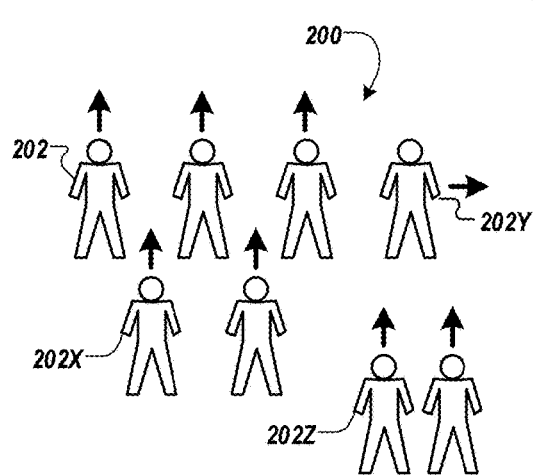
Figure 2B:
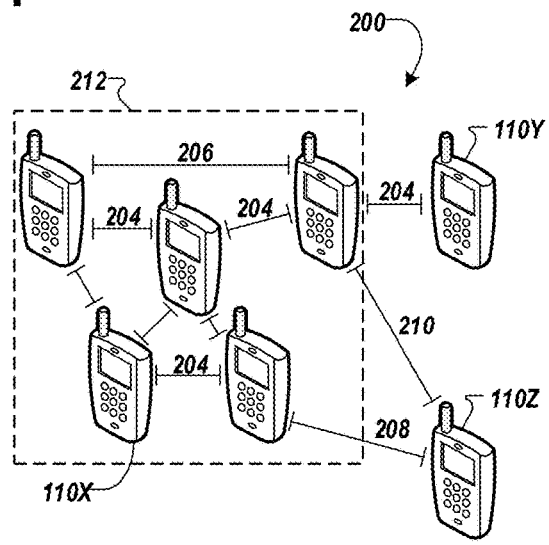
Figure 3:
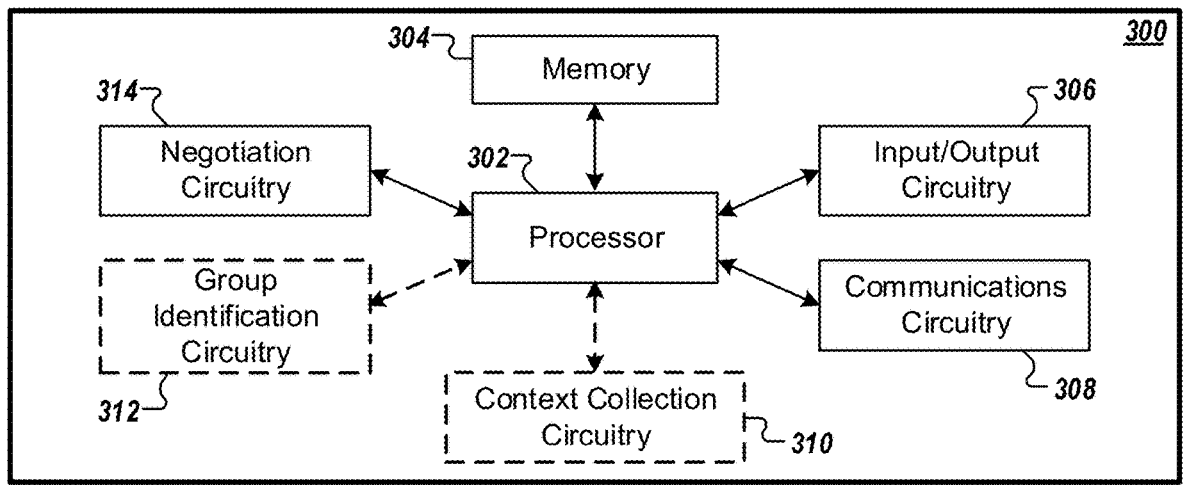
Figure 4:
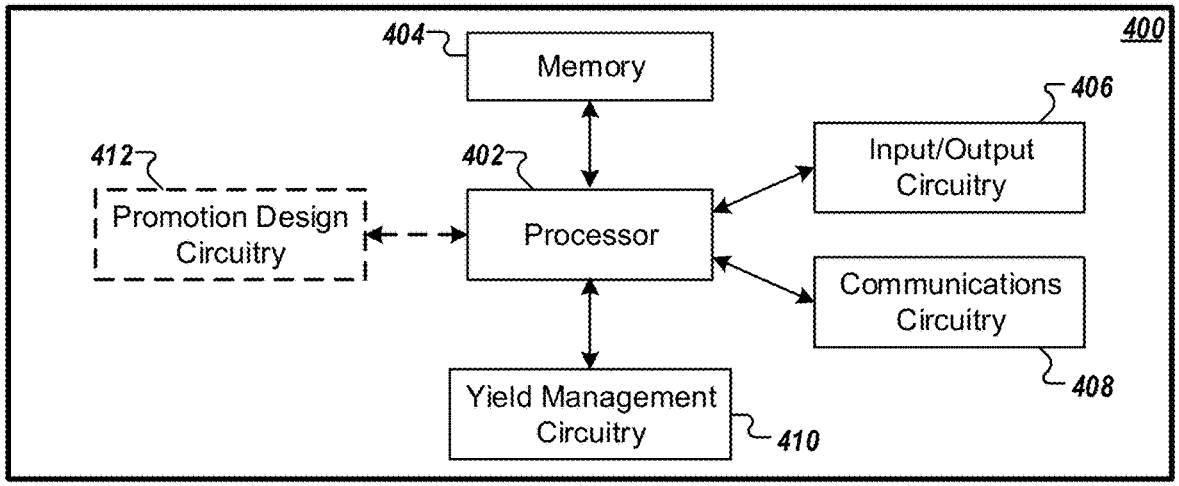
Figure 5:
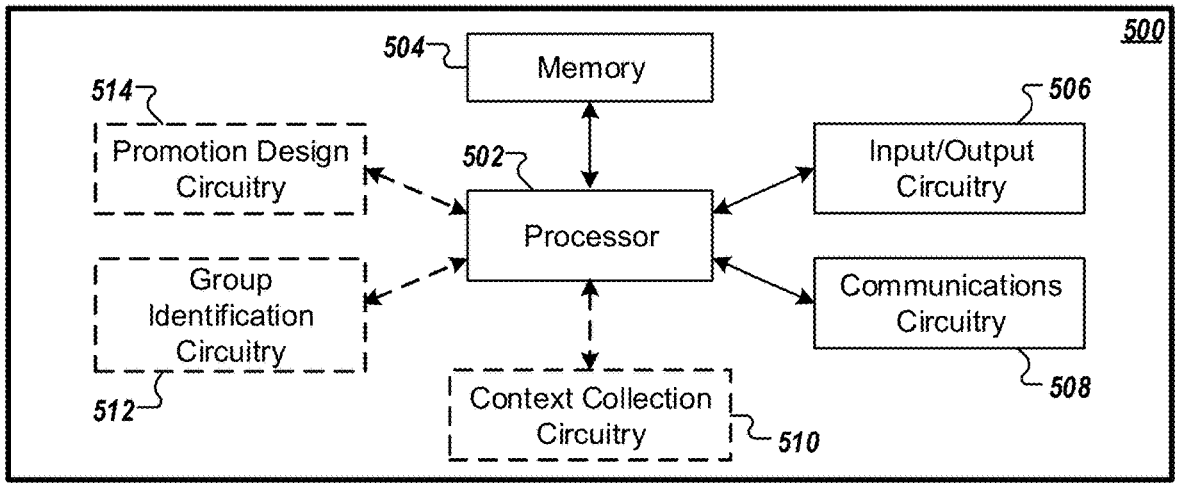
Figure 6:
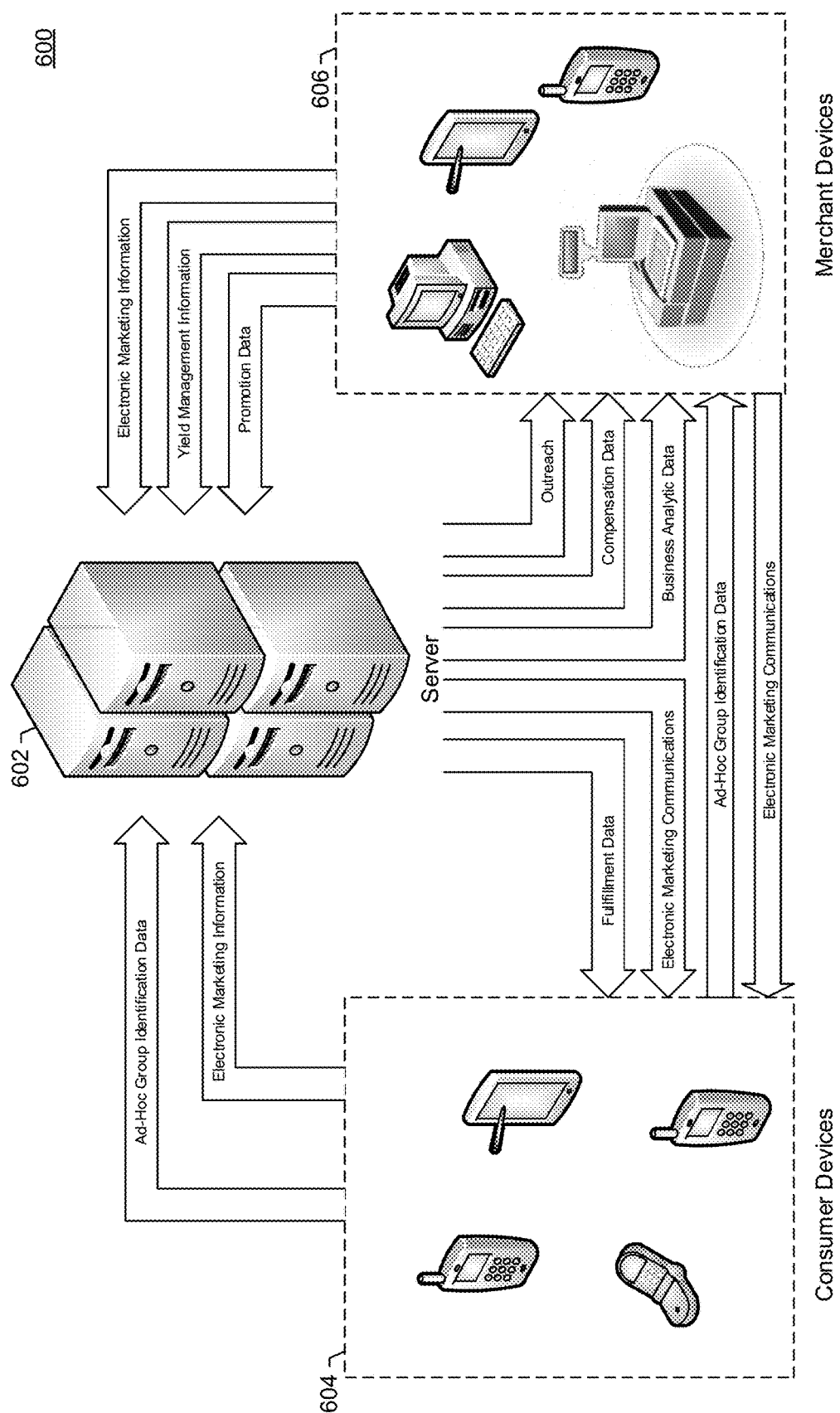
Figure 7:
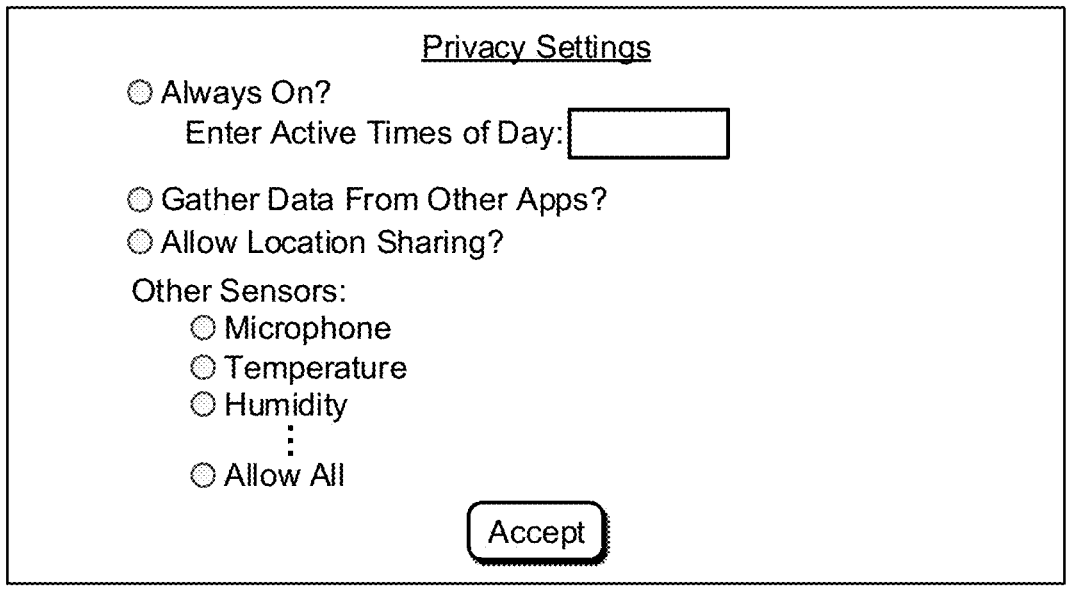
Figure 8:
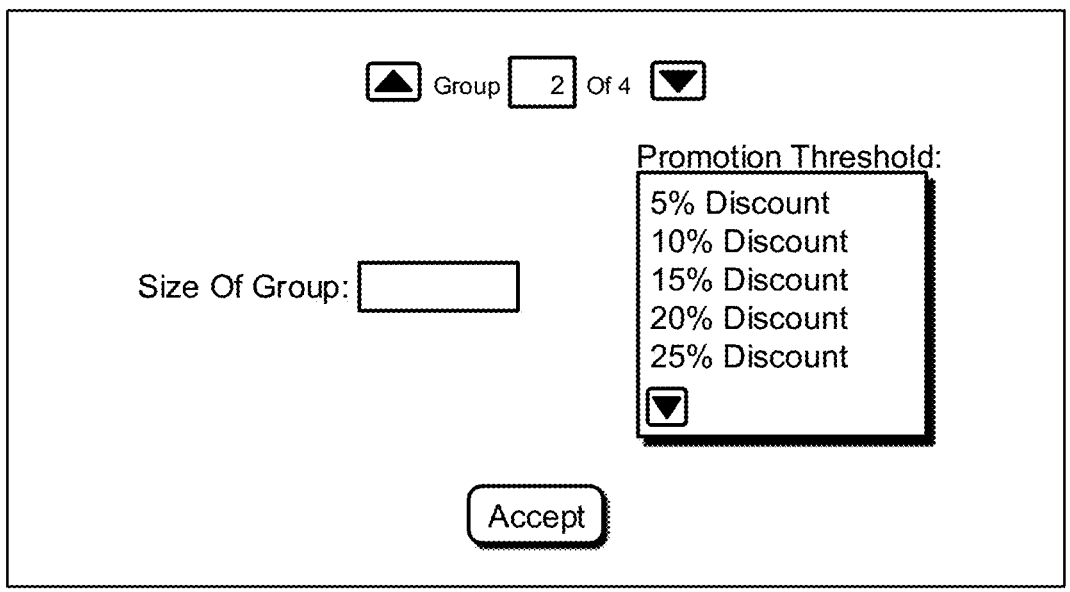
Figure 9:
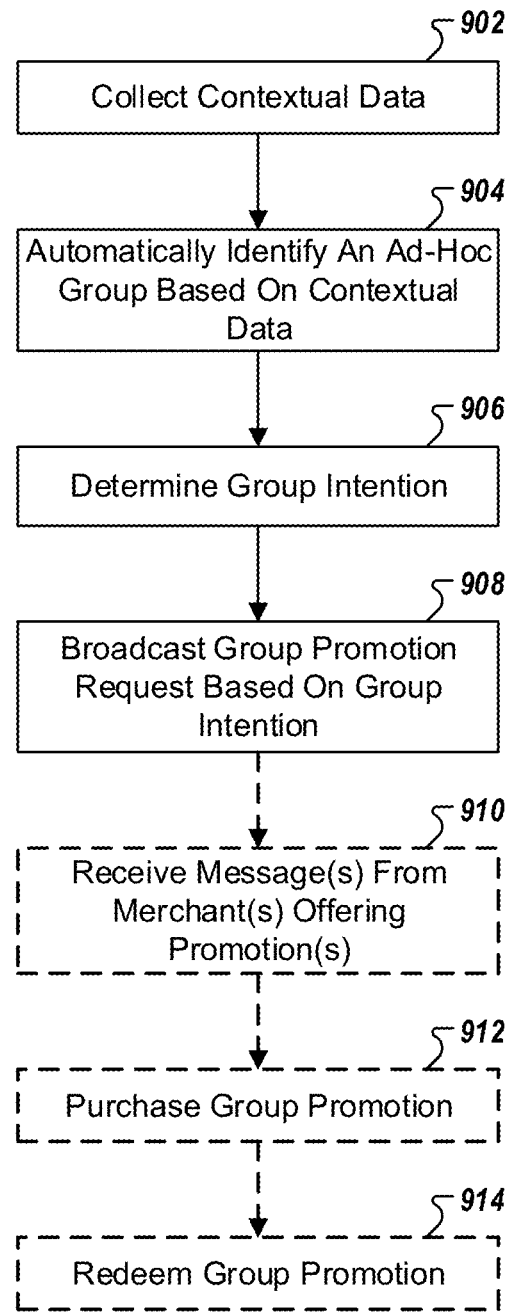
Figure 10:
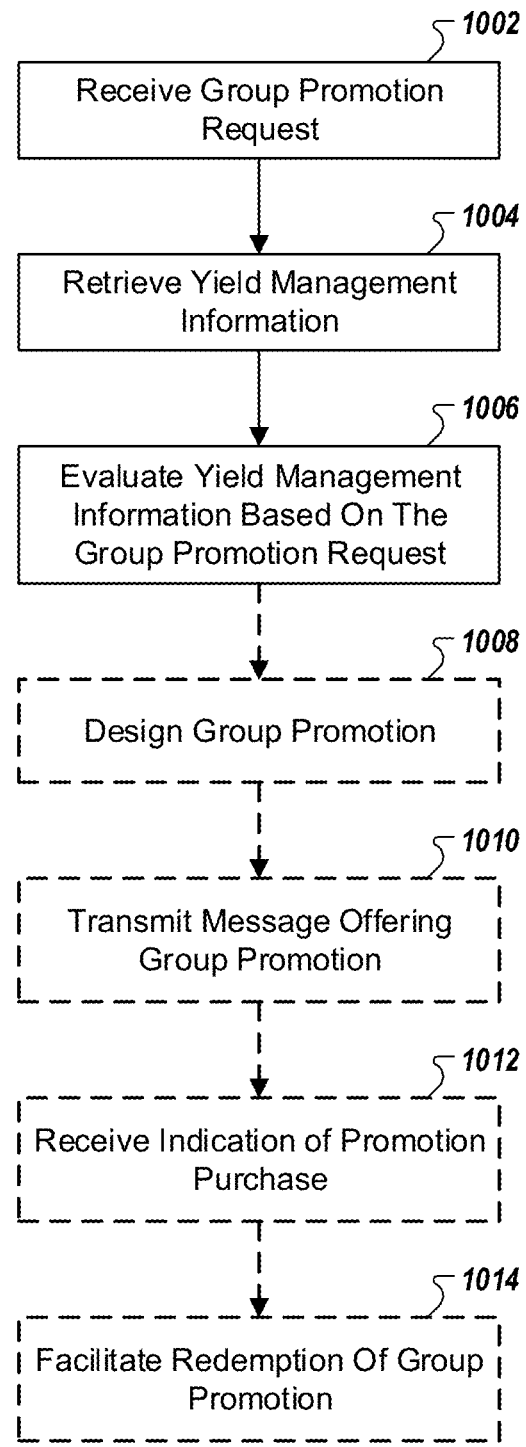
Figure 11:
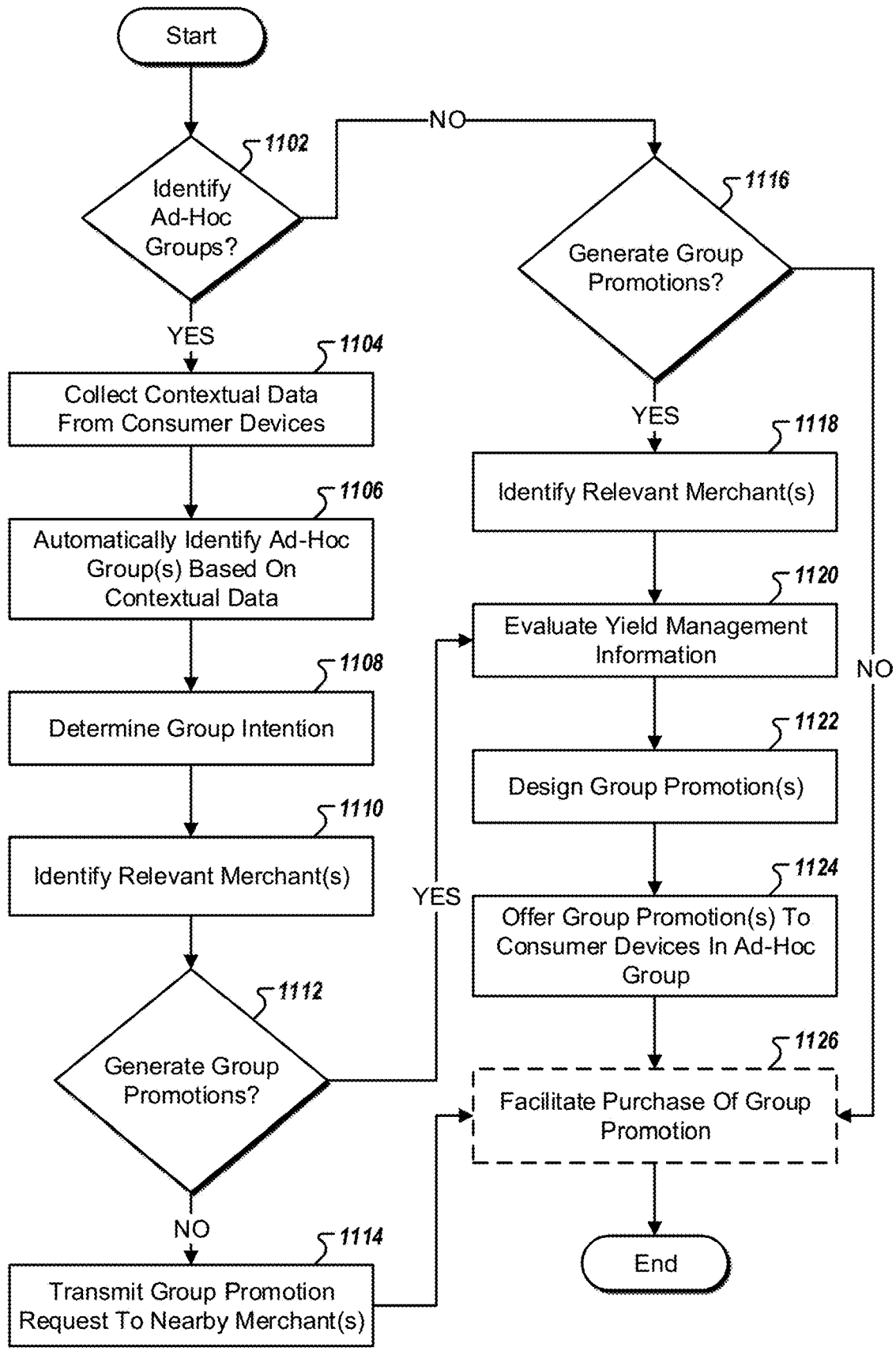

Having thus described certain example embodiments of the present disclosure in general terms, reference will now be made to the accompanying drawings, which are not necessarily drawn to scale, and wherein:

FIG. 1 shows an example system diagram, in accordance with an example embodiment of the present invention;

FIG. 2A provides a diagram of a series of consumers, some of whom may belong to an ad-hoc group, in accordance with some example embodiments;

FIG. 2B provides a diagram of a series of consumer devices associated with the series of consumers, and illustrates a subset of which comprise an ad-hoc group, in accordance with some example embodiments;

FIG. 3 illustrates a schematic block diagram of circuitry embodying a consumer device, in accordance with some example embodiments;

FIG. 4 illustrates a schematic block diagram of circuitry embodying a merchant device, in accordance with some example embodiments;

FIG. 5 illustrates a schematic block diagram of circuitry embodying a server device, in accordance with some example embodiments;

FIG. 6 illustrates an example data flow diagram illustrating interactions between a central server, one or more consumer devices, and one or more merchant devices, in accordance with some example embodiments;

FIG. 7 illustrates a user interface for configuring application settings associated with a consumer device, in accordance with some example embodiments;

FIG. 8 illustrates a user interface for configuring promotion thresholds associated with a merchant device, in accordance with some example embodiments;

FIG. 9 illustrates a flowchart describing example operations performed by a consumer device to identify an ad-hoc group of consumers and request and redeem promotions for the group, in accordance with some example embodiments;

FIG. 10 illustrates a flowchart describing example operations performed by a merchant device, in accordance with some example embodiments; and FIG. 11 illustrates a flowchart describing example operations performed by a server, in accordance with some example embodiments.

DETAILED DESCRIPTION

Overview

Businesses of all types continue to search for ways to increase revenue and profit. For promotion and marketing services, the goal is to identify promotions that are attractive to consumers while still adding value for merchants. Utilizing mobile network connectivity, the inventor has developed example systems that provide this sort of product offerings, and which were impossible to implement before the emerging ubiquity of smartphones.

To this end, one goal of a promotion and marketing service is to develop promotions that are more effective for merchants by increasing success rate, overspend, and/or up-sell potential. Convincing a group of potential customers that have a group intention to purchase a promotion to satisfy that intention will thus typically be more profitable than convincing a single customer to purchase a promotion. Group targeting also provides new levels of fulfillment for yield-management tools (e.g., it is possible to fill an empty table in a restaurant during lunch time with a group promotion, while a traditional promotion may only fill a single seat).

Example systems described below in greater detail enable self-aware ad-hoc group-forming by consumer devices. By passively collecting data via sensors and receiving signals from nearby devices, consumer devices can passively and automatically interact and determine that their respective users are members of a group. Using this knowledge, in conjunction with additional contextual data (such as the time of the day, previous purchase patterns, previously collected data, and/or the like) enable the consumer devices to develop accurate predictions regarding the group intention. Based on the automatic identification of the existence of an ad-hoc group and the identification of a group intention, consumer devices in the ad-hoc group may automatically broadcast group promotion requests. Local merchants that receive these broadcasts can then automatically evaluate local yield management information and possibly develop responsive group promotions that offer benefits to both the user group and the merchants. With near-real-time hyperlocal promotion generation, it is often the case that such benefits are larger and more appropriately tailored than promotions designed via a traditional campaign. Accordingly, win-win situations can be identified that previously have not been possible. Moreover, because these steps occur automatically, it is far more likely that consumers and merchants will participate in the system.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "vendor," "provider," and "merchant" may be used interchangeably and may include, but are not limited to, a business owner, consigner, shopkeeper, tradesperson, operator, entrepreneur, agent, dealer, organization or the like that is in the business of a providing a good, service or experience to a consumer, facilitating the provision of a good, service or experience to a consumer and/or otherwise operating in the stream of commerce. The "vendor," "provider," or "merchant" need not actually market a product or service via the promotion and marketing service, and may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

As used herein, the term "group promotion" describes a subset of promotions that are directed to groups of consumers. For instance, a group promotion may comprise an offer for 15% off lunch for groups of 5 or more. In some embodiments, group promotions may be transmitted to specifically-identified ad-hoc groups of consumer devices. In this regard, because the group promotion may be designed for a particular ad-hoc group of consumers, group promotions may include identifying information not typically utilized in other types of promotions (e.g., an example group promotion may include identifying information, such as: "Simply come in and say: 'we are the magnificent seven!'"). Moreover, as another consequence of designing group promotions for particular ad-hoc groups of consumers, group promotions may have short durations of validity (e.g., "Offer valid for the next 30 minutes"). However, while many group promotions may have short durations, a short duration is not a requirement of a group promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to the subset of types of electronic data and signals that may be interpreted by a promotion and marketing service to provide improved electronic marketing communications. Electronic marketing information may include, without limitation, clickstream data (defined below), transaction data (defined below), location data (defined below), contextual data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service (GPS) receivers, indoor navigation systems, cellular tower triangulation techniques, video surveillance systems, or radio frequency identification (RFID) location systems.

As used herein, the term "contextual data" refers to electronic information providing information regarding the physical context of a particular device. Contextual data may be associated with a consumer, a merchant, or any other entity capable of interaction with the promotion and marketing service. For example, in some embodiments, contextual data includes location data provided by a location services module of the particular device. In addition to location data, however, contextual data may include velocity or acceleration data, gyroscopic data, data regarding a direction-of-travel, calculated data regarding the mode of travel (e.g., walking, jogging, biking, vehicular movement, or the like) of the particular device. Contextual data may also comprise sensor readings regarding ambient environmental conditions of the particular device (e.g., temperature, humidity, brightness, gravity, orientation, proximity, or the like) and may further comprise interpretations of audio data captured by a microphone. Contextual data may also include data regarding the proximity of other devices to the particular device, which can be calculated based on signals transmitted between the particular device and the other devices. Moreover, contextual data may include environmental indicators, such as the time of the day, day of the week, seasons, country identification, or the like. Moreover, contextual data may also include historical information stored by the device or retrieved from another device (or from a promotion and marketing service). Accordingly, contextual information may form the basis of group intention determinations. It should be appreciated that contextual data may be provided by various systems and sensors provided by the particular device or devices under control of the particular device, received from other devices, received from local or external databases, or received from a user via a user interface. Contextual information may further include results generated by the particular device as a result of analyzing other contextual data.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service or a merchant and to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "merchant-specific correspondence" refers to any electronically generated information content provided by the promotion and marketing service to a merchant for the purpose of merchant acquisition. Merchant-specific correspondence may include any email, short message service (SMS) message, web page, application interface, or the like electronically generated for the purpose of attempting to develop a business relationship with the merchant.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

It should be appreciated that the term "yield management" is intended to refer to a variable marketing strategy designed to manage a merchant's fixed, perishable resources (e.g., in a restaurant environment, table availability, inventory, specials available, or the like). In this regard, employment of a yield management strategy relies upon analyzing this underlying yield management information (the fixed, perishable resources) and may further include preconfiguring promotion thresholds (e.g., if a group is at least five people, offer a 10% discount, and if the group is over 10 people, offer a 25% discount). For example, a restaurant may monitor local yield management information to determine table utilization, bar capacity, or the like, and, if utilization is low, may authorize a range of promotions designed to reward large groups that patronize the restaurant based on these preconfigured promotion thresholds.

As used herein, a "triggering event" refers to an occurrence indicative of a potentially useful marketing opportunity for a promotion and marketing service or a merchant. Triggering events comprise business-relevant events and are identified based on a predefined set of business rules. A triggering event may be identified from electronic marketing information or business analytic data collected by a promotion and marketing service. For instance, identification of consumer demand for a particular product or service may comprise a triggering event that indicates an appropriate time to contact a merchant offering the particular product or service for sale. Moreover, triggering events may further be identified by consumer devices. For example, consumer device determination that it and nearby consumer devices are associated in an ad-hoc group having a particular group intention may comprise a triggering event. In addition to, triggering events may be time-wise in nature (e.g., occurrence of a weekend, holiday, or seasonal change), or may comprise the occurrence of an external event (e.g., listing or conclusion of a promotion on a competing promotion and marketing service, identification of heightened merchant availability information on third party applications such as OpenTable®, information regarding new merchants that have recently begun offering products or services, or the like). Triggering events may be identified based on combinations of the above events. For instance, a triggering event may not occur based simply on a seasonal change, but may occur if that seasonal change occurs within a predetermined time of the identification of a new merchant that offers seasonally appropriate goods or services.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient manner. For instance, electronic marketing services are hindered by technological obstacles unique to the electronic nature of the services provided, such as constraints on the speed and accuracy of human-machine communication. In the face of increasing reliance on human-machine interaction as a central element of many consumer activities, the clumsiness of interaction between users and machinery remains a bottleneck for consumers and merchants alike. Accordingly, there remain significant problems associated with providing relevant, high quality electronic marketing communications to consumers and merchants in a manner that is user friendly and avoids frustration.

In order to address these concerns, embodiments of the present invention remove many layers of human-machine interaction to, in many cases, improve the speed and accuracy of promotion marketing operations, to the benefit of both consumers and merchants. Accordingly, embodiments of the present invention therefore provide improvements that address problems arising out of the electronic nature of existing services.

Moreover, embodiments of the present invention unlock promotional possibilities that previously were not possible, given the speed of interaction between consumer and merchant devices. In this regard, passive and automated monitoring and analysis of data received by consumer devices enables the generation of hyperlocal promotions having narrow durations of availability (e.g., promotions that are available for a matter of minutes or hours) that fill unplanned immediate needs, where prior mechanisms for developing promotions could not address these goals. Moreover, because of the standardization of sensor technology on mobile devices, in conjunction with improvements in personal area network (PAN) technology, passive interaction between devices is increasingly practical for every-day use.

Accordingly, various embodiments of the present invention provide systems that passively and automatically identify ad-hoc user groups and respective group intentions, and generate group promotions designed for those ad-hoc user groups. Such embodiments thus avoid hurdles imposed by traditional mechanisms of generating promotions, such as the requirement for significant human-machine interaction that historically has dissuaded many consumers and merchants from utilizing a promotion and marketing service. Moreover, various embodiments of the present invention provide a new avenue for near-real-time generation and purchasing of group promotions that has not previously been possible.

System Architecture and Example Apparatuses

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more consumer or merchant devices. Example embodiments include any of a variety of mobile terminals, such as a portable digital assistant (PDA), mobile telephone, smartphone, laptop computer, tablet computer, or any combination of the aforementioned devices.

In this regard, FIG. 1 discloses an example computing system 100 within which embodiments of the present invention may operate. As illustrated, a promotion and marketing service 102 may be connected to series of consumer devices 110A through 110N. Similarly, merchants may interact with the promotion and marketing service 102 using merchant devices 112A through 112N. The promotion and marketing service 102 may comprise a server 104 in communication with a database 106.

The server 104 may be embodied as a computer or computers as known in the art. The server 104 may provide for receiving of electronic marketing information from various sources, including but not necessarily limited to the consumer devices 110A-110N and the merchant devices 112A-112N. For example, the server 104 may be operable to receive and process clickstream data or contextual data provided by the consumer devices 114 and/or the merchant devices 112. The server 104 may also facilitate e-commerce transactions based on transaction information provided by the consumer devices 114 and/or the merchant devices 112. The server 104 may facilitate the generation and providing of various electronic communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include user account credentials for merchants, and consumers, data indicating the products and promotions offered by the promotion and marketing service, electronic marketing information (e.g., clickstream data, transaction data, location data, communication channel data, or discretionary data), analytic results, reports, financial data, and/or the like.

The consumer devices 110A-110N may be embodied by any computing devices known in the art. Electronic marketing information received by the server 104 from the consumer devices 110A-110N may be provided in various forms and via various methods. For example, the consumer devices 110A-110N may include laptop computers, smartphones, netbooks, tablet computers, wearable devices, or the like. The information may be provided through various sources on these consumer devices.

In embodiments where a consumer device 110 is a mobile device, such as a smart phone or tablet, the mobile device may execute an "app" to interact with the promotion and marketing service 102 and merchant devices 112A-112N. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

In the case of a consumer device 110, the promotion and marketing service 102 may leverage the application framework offered by the mobile operating system to allow consumers to designate which information is harvested by the app and which may then be provided to the promotion and marketing service 102. In some embodiments, consumers may "opt in" to provide particular different types of contextual data in exchange for a benefit, such as improved relevance of marketing communications offered to the user. In some embodiments, the consumer may be provided with privacy information and other terms and conditions related to the electronic marketing information harvested by the consumer device 110 and provided to the promotion and marketing service 102 during installation or use of the app. Once the consumer provides access to a particular feature of the consumer device 110, information derived from that feature may in some embodiments be provided to the promotion and marketing service 102 to improve the quality of the consumer's interactions with the promotion and marketing service and/or merchants.

For example, the consumer may indicate a desire to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 110 may interact through the promotion and marketing service 102 or merchant device 112 via a web browser. As yet another example, the consumer device 110 may include various hardware or firmware designed to interface with the promotion and marketing service 102 or merchant device 112 (e.g., where the consumer device 110 is a purpose-built device offered for the primary purpose of communicating with the promotion and marketing service 102).

The merchant devices 112A-112N may be any computing devices known in the art and operated by a merchant. For example, the merchant devices 112A-112N may include a merchant point-of-sale device, a merchant e-commerce server, a merchant inventory system, a computing device accessing a web site designed to provide merchant access (e.g., a smartphone, PDA, or desktop computer configured to access a web page via a browser using a set of merchant account credentials), or even a standard telephone. The merchant device may execute an application to interact with the promotion and marketing service 102 and consumer devices 110A-110N. In this regard, the merchant devices 112A-112N may design promotions based on yield management information (including, for instance, utilizing preconfigured promotion thresholds as defined above). Electronic marketing information received by the promotion and marketing service 102 from the merchant devices 112A-112N may be provided in various forms and via various methods. For example, the merchant devices 112A-112N may provide real-time yield management information, such as transaction and/or inventory information, as purchases are made from the merchant. In other embodiments, the merchant devices 112A-112N may be employed to provide information to the promotion and marketing service 102 to enable the promotion and marketing service 102 to generate promotions or other marketing information to be provided to consumers. Similarly, the merchant devices 112A-112N may receive data, such as business analytic data, compensation data, or marketing outreach communications from the promotion and marketing service 102 and/or a consumer device 110A-110N.

As a foundation for some embodiments, the application may prompt the merchant to provide yield management information and/or set up preconfigured promotion thresholds that provide guidelines for the automatic generation of group promotions. Moreover, the application may cause the merchant device 112 to harvest electronic marketing information and provide that information to the promotion and marketing service 102. Once the merchant provides access to a particular feature of the consumer device 110, information derived from that feature may in some embodiments be provided to the promotion and marketing service 102 to improve the quality of the merchant's interactions with the promotion and marketing service and/or consumers.

Ad-Hoc Group Formation

Turning now to FIGS. 2A and 2B, some example mechanisms are illustrated by which ad-hoc groups of consumer devices may be formed. FIG. 2A illustrates a diagram of environment 200 having eight consumers 202, five in a first group, two in a second group, and one consumer that is not in a group at all. Promotion and marketing services have attempted to specifically target consumers via electronic marketing communications delivered based on consumer-specific information, such as location information received from a consumer device 110 carried by the consumer. While such systems demonstrate some effectiveness, they nevertheless do not capture all of the information that might be useful to a merchant or promotion and marketing service. For instance, even if the location of a consumer (e.g., consumer 202X) is known and a merchant or promotion and marketing service delivers an electronic marketing communication to consumer 202X, the merchant or promotion and marketing service would be unaware that consumer 202X is part of larger group of consumers, and thus loses out on the opportunity to appeal to a larger set of potential customers.

As shown in FIG. 2A, consumer 202X is traveling in a group of five consumers, as evidenced by their close proximity and travel at the same speed in a single direction. A separate consumer 202Y appears in similarly close proximity to this group of five consumers, but consumer 202Y is traveling in a different direction, which illustrates the fact that consumer 202Y is not, after all, part of the group. The group of two consumers (including consumer 202Z) are traveling in the same direction as the group of five, but are separated by a fairly large distance, as would be expected of two distinct groups of individuals. While visual inspection demonstrates that it is possible to distinguish the groups in FIG. 2A from each other and from the separate consumer 202Y, traditional systems employed by promotion and marketing services would be unable to identify the existence and delineations between these groups of consumers by receiving only data received from a single consumer device 110. Even if existing systems coincidentally interact separately with a number of consumer devices 110 carried by consumers in environment 200, promotion and marketing services do not traditional utilize this data in conjunction to identify possible promotions that would apply to multiple consumers in conjunction. In other words, traditional systems do not display the capability or desire to connect disparate data elements in a way that enables the generation of group promotions.

Turning now to FIG. 2B, another representation of environment 200 is shown. Rather than displaying the series of consumers 202, though, FIG. 2B illustrates the consumer devices 110 associated with each consumer, which presents a more accurate representation of the manner by which systems described herein analyze various environments. As show in FIG. 2B, embodiments described herein contemplate analyzing relative data regarding the consumer devices 110 in an effort to identify ad-hoc groups based on contextual data that may be collected from consumer devices 110. In this regard, the foundation of ad-hoc group identification is physical proximity. For instance, an initial filter for ad-hoc group identification may be based on the relative locations the consumer devices 110 within environment 200. As shown in FIG. 2B, several of the devices are a short distance 204 away from each other (and others are closer). In fact, there are six devices (including devices 110X and 110Y that correspond to consumers 202X and 202Y) that fall within this class. Thus, utilizing location data of consumer devices in an environment, reasonably accurate group identification is possible. However, utilizing only a single data type will produce a high error-rate. In this particular example, this is shown by the identification of a six device ad-hoc group, when the actual group contains only five consumers. Accordingly, physical proximity is not necessarily the only basis on which ad-hoc groups may be identified.

To improve the accuracy of ad-hoc group identification, example embodiments can take into account a wide variety of contextual data to filter out false-positives. In the example shown in FIGS. 2A and 2B, one type of additional relevant contextual data may comprise identifying the direction of travel of the various consumer devices. Direction of travel information is provided for reference in FIG. 2A, but this information can be calculated based on contextual data retrieve from each of the consumer devices. Upon analysis of direction of travel data of each of the consumer devices in FIG. 2B, it is possible for example embodiments to identify that consumer 202Y (and corresponding consumer device 110Y) is actually traveling in a different direction from the other five devices within close proximity to each other, and thus that consumer 202Y is not a member of an ad-hoc group with the other five devices. Subsequently, calculating a total distance between the farthest apart consumer devices in an identified ad-hoc group (here, distance 206) provides a useful heuristic that helps to check the accuracy of the ad-hoc group identification.

It should be noted that consumer 202Z, located at distances 208 and 210 from the nearest consumer devices, was not even identified as a possible member of an ad-hoc group due to the initial proximity filter. In other words, because consumer 202Z (who carries associated device 110Z) is distance 208 from the closest consumer device, and distance 210 from the second closest consumer device, and because these distances 208 and 210 are larger than a predefined maximum distance for possible group membership identification, simple location measurements are enough to disqualify consumer 202Z from membership in an ad-hoc group with the five close-together devices. Accordingly, utilizing just two types of information (location and direction-of-travel), embodiments described herein may identify the five-device ad-hoc group 212.

In other embodiments, however, any type of contextual information may be taken into account in the ad-hoc group identification determination. For instance, environmental data, such as time-of-day, temperature, or the like, may be used to determine an initial likelihood that any ad-hoc groups exist at all. For instance, at 9 am on a Tuesday morning, it's far more likely that a group of consumer devices in close proximity and traveling in the same direction should not be classified as an ad-hoc group due to the relative likelihood that this occurrence is a result of morning commutes. Alternatively, the same scenario occurring at noon may indicate a lunch-time group.

FIG. 2B only illustrates seven consumer devices 110, while FIG. 2A shows eight separate consumers 202. This discrepancy may exist for a number of reasons. For instance, the extra consumer in FIG. 2A may not carry a consumer device 110, and thus may not be identifiable using embodiments described herein. Alternatively, the extra consumer may carry a consumer device 110, but that consumer device may not have an appropriate "app" installed that facilitates transmission or receipt of contextual data, or may have privacy settings selected that prevent transmission or receipt of this contextual data.

It should be understood that while some embodiments demonstrate the consumer devices 110 communicating with each other to self-identify as members of an ad-hoc group, other embodiments are also possible. For instance, a promotion and marketing service communicating with each consumer device separately may collate all the received contextual data to identify the underlying connections between the consumers.

Example Implementing Apparatuses

Each consumer devices 110A-110N may be embodied by one or more computing systems, such as apparatus 300 shown in FIG. 3. As illustrated in FIG. 3, the apparatus 300 may include a processor 302, a memory 304, input/output circuitry 306, communications circuitry 308, context collection circuitry 310, group identification circuitry 312, and negotiation circuitry 314. The apparatus 300 may be configured to execute the operations described above with respect to FIG. 1 and below with respect to FIG. 9. Although these components 302-314 are described with respect to functional limitations, it should be understood that the particular implementations necessarily include the use of particular hardware. It should also be understood that certain of these components 302-314 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display that may include a web user interface, a mobile application, a client device, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Context collection circuitry 310 includes hardware components designed to gather contextual data. These hardware components may, for instance, include one or more sensors (e.g., motion sensors, environmental sensors, position sensors), and may utilize communications circuitry 308 to receive signals and contextual data from remote devices (e.g., other consumer devices, merchant devices, or a promotion and marketing service).

Context collection circuitry 310 may utilize processing circuitry, such as the processor 302, to perform the above operations, and may utilize memory 304 to store the collected contextual data. It should also be appreciated that, in some embodiments, the context collection circuitry 310 may include a separate processor, specially configured field programmable gate array (FPGA), or application specific interface circuit (ASIC) to collect and/or generate the sales intelligence data. The context collection circuitry 310 is therefore implemented using hardware components of the apparatus configured by either hardware or software for implementing these planned functions.

Group identification circuitry 312 includes hardware configured to automatically identify ad-hoc group based on contextual data. Similarly, group identification circuitry 312 may further determine a group intention associated with the identified ad-hoc group based on the contextual data and possibly other external factors, such as environmental indicators, historical information, or the like. It should be appreciated that, in some embodiments, the group identification circuitry 312 may include a separate processor, specially configured field programmable gate array (FPGA), or application specific interface circuit (ASIC) to classify merchants into different segments based on the content harvested by the content harvesting circuitry 210. The group identification circuitry 312 is therefore implemented using hardware components of the apparatus configured by either hardware or software for implementing these planned functions.

Negotiation circuitry 314 includes hardware configured to interact with other consumer devices within an identified ad-hoc group. In one example embodiment, such interaction may occur during selection of a group promotion for purchase or redemption. In this regard, negotiation circuitry 314 may utilize input/output circuitry 306 to capture consumer input, such as, for example, by providing a voting interface by which the consumer is able to vote for and/or rank a series of group promotions received from nearby merchants. Negotiation circuitry may utilize communications circuitry 308 to transmit and receive this consumer input and similar consumer input from the other consumer devices in the ad-hoc network. It should be appreciated that, in some embodiments, negotiation circuitry 314 may include a separate processor, specially configured field programmable gate array (FPGA), or application specific interface circuit (ASIC) to perform these functions. In such embodiments, negotiation circuitry 314 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It should be understood that while context collection circuitry 310 and group identification circuitry 312 are described as elements of a consumer device 300, in some embodiments, one or more external systems (such as a promotion and marketing service 102) may also be leveraged to provide at least some of the functionality of those circuitry elements.

As described above and as will be appreciated based on this disclosure, embodiments of the present invention may be configured as systems, methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The merchant device(s) 112 may be embodied by one or more computing systems, such as apparatus 400 shown in FIG. 4. As illustrated in FIG. 4, the apparatus 300 may include a processor 402, a memory 404, an input/output circuitry 406, and a communications circuitry 408. As it relates to operations described in the present invention, the functioning of the processor 402, the memory 404, the input/output circuitry 306, the communication circuitry 408, and negotiation circuitry 414 may be similar to the similarly named components described above with respect to FIG. 3, and for the sake of brevity, additional description of the mechanics of these components is omitted. Nevertheless, these device elements, operating together, provide the apparatus 400 with the functionality necessary to facilitate the communication of data (e.g., electronic marketing information, business analytic data, or the like) between a consumer, a promotion and marketing service, and the merchant operating the merchant device(s) 112.

Yield management circuitry 410 includes hardware configured to analyze yield management information (e.g., fixed resource availability and costs associated with allocating those resources) and identify whether a group promotion would provide a positive return on investment. It should be appreciated that, in some embodiments, yield management circuitry 410 may include a separate processor, specially configured field programmable gate array (FPGA), or application specific interface circuit (ASIC) to perform these functions. Yield management circuitry 410 is therefore implemented using hardware components of the apparatus configured by either hardware or software for implementing these planned functions.

Promotion design circuitry 412 includes hardware configured to design a group promotion in response to receipt of a group promotion request. In this regard, promotion design circuitry 412 may utilize preconfigured promotion thresholds to automatically tier promotions based on the information contained in group promotion requests. It should be appreciated that, in some embodiments, promotion design circuitry 410 may include a separate processor, specially configured field programmable gate array (FPGA), or application specific interface circuit (ASIC) to perform these functions. Promotion design circuitry 410 is therefore implemented using hardware components of the apparatus configured by either hardware or software for implementing these planned functions.

It should be understood that while promotion design circuitry 412 is described as an element of a merchant device 400, in some embodiments, one or more external systems (such as a promotion and marketing service 102) may be leveraged to provide at least some of the functionality of this circuitry element.

The server device(s) 104 may be embodied by one or more computing systems, such as apparatus 500 shown in FIG. 5. As illustrated in FIG. 5, the apparatus 300 may include a processor 502, a memory 504, an input/output circuitry 506, a communications circuitry 508, a context collection circuitry 510, a group identification circuitry 512, and promotion design circuitry 514. As it relates to operations described in the present invention, the functioning of the processor 502, the memory 504, and the circuitry elements may be similar to the similarly named components described above with respect to FIGS. 3 and 4, and for the sake of brevity, additional description of the mechanics of these components is omitted. Nevertheless, these device elements, operating together, provide the apparatus 500 with the functionality necessary to facilitate the communication of data (e.g., electronic marketing information, business analytic data, or the like) between the promotion and marketing service and one or more consumer operation a consumer device 110 and/or merchant operating a merchant device(s) 112.

Having described specific components of example consumer devices 300, merchant devices 400, and server devices 500, an example of a data flow for exchanging electronic information among one or more consumer devices, merchant devices, and the promotion and marketing service is described below with respect to FIG. 6.

Example Service Data Flow

FIG. 6 depicts an example data flow 600 illustrating interactions between a server 602, one or more consumer devices 604, and one or more merchant devices 606. The server 602 may be implemented in the same or a similar fashion as the server 104 as described above in conjunction with FIG. 1, the one or more consumer devices 604 may be implemented in the same or a similar fashion as the consumer devices 110A-110N described above in conjunction with FIG. 1, and the one or more merchant devices 606 may be implemented in the same or a similar fashion as the merchant devices 112A-112N described above in conjunction with FIG. 1.

The data flow 600 illustrates how electronic information may be passed among various systems, in accordance with embodiments of the present invention. The one or more consumer devices 604 and/or one or more merchant devices 606 may provide a variety of electronic marketing information to the server 602 for use in providing promotion and marketing services to the consumer. It should also be appreciated that this electronic marketing information may be collected by the server 602 from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic marketing information. It should be appreciated that this electronic marketing information may include contextual data harvested by the respective one or more consumer devices 604 and/or one or more merchant devices 606. Contextual data received from the one or more consumer devices 604 may be used by the server 602 to identify ad-hoc user groups and group intentions associated with those ad-hoc user groups. Similarly, contextual data received from the one or more merchant devices 606 may be used by the server 602 to identify relevant merchants that may benefit from generating group promotions directed to particular ad-hoc user groups.

It should be understood that in some embodiments the one or more consumer devices 604 may identify ad-hoc user groups without requiring interaction with the server 602, and that the one or more consumer devices 604 may accordingly broadcast ad-hoc group identification data. Thus, the ad-hoc group identification data may be received by both the server 602 and separately by the one or more merchant devices 606. In turn, in some embodiments the one or more merchant devices 606 need not transmit contextual data to the server 602 either, as that contextual data may be basis for developing electronic marketing communications to the one or more consumer devices 604. In such embodiments, the one or more merchant devices 606 may themselves generate electronic marketing communications (e.g., they may develop group promotions for offer to the ad-hoc group of consumer devices), and may thus also transmit electronic marketing communications directly to the one or more consumer devices 604.

As a result of transactions performed between the one or more consumer devices 604 and the server 602, the server 602 may provide fulfillment data to the consumer devices. The fulfillment data may include information indicating whether a transaction was successful, the location and time a product will be provided to the consumer, instruments for redeeming promotions purchased by the consumer, or the like.

In addition to the e-commerce interactions with the one or more consumer devices 604 offered by the server 602, the server 602 may leverage information provided by the consumer devices 604 to improve the relevancy of electronic marketing communications sent to individual consumers or groups of consumers. In this manner, the server 602 may determine promotions, goods, and services that are more likely to be of interest to a particular consumer or group of consumers based on the electronic marketing information provided by and/or relating to particular consumers. For example, the server 602 may evaluate contextual data (for example, by detecting the location of a consumer based on location data provided by the consumer device, and send electronic marketing communications (e.g., offer promotions) based on, for instance, the proximity of the consumer to the merchant associated with those promotions.

It should also be appreciated that the server 602 may also control other factors of the electronic marketing communications sent to the consumer other than the particular promotions included in the electronic marketing communication. For example, the server 602 may determine the form, structure, frequency, and type of the electronic marketing communication. As with the content of the electronic marketing communication, these factors may be programmatically determined according to various methods, factors, and processes based on electronic marketing information received by the server 602 for the purpose of maximize the likelihood that the communication will be relevant to the recipient consumer.

The server 402 interactions with the one or more merchant devices 406 may be related to enabling the merchant to market their products using a promotion and marketing service. For example, the one or more merchant devices 406 may provide promotion data defining one or more promotions (including, for instance, group promotions) to be offered by the promotion and marketing service on behalf of the merchant. The server 402 may receive this information and generate information for providing such promotions via an e-commerce interface, making the promotions available for purchase by consumers. The server 402 may also receive yield management information from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

The one or more merchant devices 406 may also receive outreach communications from the server 402. For example, the promotion and marketing service may communicate with a merchant who offers a product or service for which the promotion and marketing service identifies a potentially beneficial business relationship. In situations in which the server 602 identifies ad-hoc groups of consumer devices 604, these outreach communications may include the ad-hoc group identification data relevant to the one or more merchant devices 606.

Embodiments advantageously provide improvements to consumer and merchant interaction with the promotion and marketing service by enabling the automatic transfer of group identification and group promotion information. Accordingly, embodiments described herein avoid the bottleneck caused by undue reliance on manual consumer/merchant action.

Example Operations Performed by a Consumer Device

Having described the circuitry comprising embodiments of the present invention, it should be understood that ad-hoc group promotions may advantageously be deployed in a number of ways, described in greater detail below. FIG. 9 broadly illustrates a flowchart containing a series of operations performed by a consumer device to identify an ad-hoc group of consumers and request and redeem promotions for the group, in accordance with example embodiments described herein. The operations illustrated in FIG. 9 may, for example, be performed by a consumer device 110, with the assistance of, and/or under the control of an apparatus 300.

In operation 902, apparatus 300 includes means, such as communications circuitry 308, context collection circuitry 310, or the like, for collecting contextual data. In this regard, collecting the contextual data may include capturing, by sensors controlled by the consumer device, location data, velocity data, acceleration data, data identifying a direction-of-travel of the consumer device, gyroscopic data, temperature data, humidity data, brightness data, gravitational data, orientation data, proximity data, or audio data. Additionally or alternatively, collecting contextual data may include receiving signals from other consumer devices, wherein collecting the contextual data comprises identifying distances between the consumer device and the other consumer devices. In this regard, collecting contextual data may further include retrieving, by the consumer device, historical information regarding the other consumer devices. Similarly, in some embodiments, collecting the contextual data may include receiving contextual data from the other consumer devices.

In operation 904, apparatus 300 includes means, such as processor 302, group identification circuitry 312, or the like, for identifying, based on the collected contextual data, an ad-hoc group of consumer devices. In some embodiments, this identification may be based primarily on location information, so identifying the ad-hoc group of consumer devices may initially include identifying, from the contextual data, a first set of consumer devices, wherein the first set of consumer devices comprise consumer devices within a predetermined distance of the consumer device, wherein the ad-hoc group of consumer devices comprises the consumer device and consumer devices from the set of consumer devices. In some cases, more refinement may be necessary to eliminate false positives. Accordingly, identifying the ad-hoc group may further include retrieving, based on the contextual data, a direction of travel of the consumer device and directions of travel of each consumer device in the first set of consumer devices, wherein the ad-hoc group of consumer devices excludes consumer devices from the first set that do not have a similar direction-of-travel as the consumer device. Additionally or alternatively, identifying the ad-hoc group may further comprise retrieving, based on the contextual data, historical information, and identifying, based on the historical information, consumer device in the first set of consumer devices having similar purchasing patterns as the consumer device, wherein the ad-hoc group of consumer devices excludes consumer devices from the first set of consumer devices that do not have similar historical purchasing patterns. To make a positive ad-hoc group identification (among candidates in any given locality) and be able to corral several consumer devices into a potential ad-hoc grouping, the apparatus 300 may in some embodiments detect that several consumer devices go to same location during working hours in addition to determining that on a regular basis they also move together to another location during lunch time, for the same durations of time. These determinations may be made, for instance, using geo-fencing and time-stamp data.

For example, with access to historical information, it is possible to determine that consumers associated with two consumer devices eat at the same establishment on a regular basis. Based on this similarity, the apparatus 300 may access and analyze geo-fencing data associated with those consumer devices. If the two consumer devices are at another location during working hours (e.g., 9-5 PM), then the apparatus 300 can determine that they are co-workers. This methodology can be extended to more than two co-workers as well.

As another example, the apparatus 300 may, upon accessing and analyzing geo-fencing data associated with two consumer devices, determine that the two consumer devices are at the same venue location at the same time on a regular basis. From this determination, the apparatus 300 may predict that the two consumers form a couple and that one is in charge of the purchases. Building upon this concept, if the purchased promotions are associated with family activities (i.e., trips to the zoo, child-care promotions, promotions for more than two people), the apparatus 300 may further determine the consumers associated with the two consumer devices have a family in common, and this family determination may then provide the basis for future promotions to one or both of the consumer devices.

However, it should be understood that the accuracy of ad-hoc group identification is affected by at least two contextual variables: (1) how many participating consumers appear to behave like a group, and (2) the risk versus the benefit of any given demographic (for instance, the risk of misidentifying two consumers as roommates living in a single-home address as an ad-hoc group is lower than the risk of misidentifying two consumers who work in a multi-story office building as co-workers, because there are fewer chances for false positives in the first example than the second). The following examples illustrate this point. Example A: two consumers that spend nights on same location in the suburbs (low density housing) are likely to form a couple (roommates, partners, or even two adults of a larger family including additional individuals), so a prediction that they comprise a two-person group is justified. In a city (high-density housing with multiple-story apartment dwellings) that determination has more risk of being a false positive. Example B: the fact that two consumers spend time at the same location during working hours and eat at same location during lunch time might not be enough to determine that they know each other (i.e., a popular food court next to a large office building may create many false positives based on this data). However, five or more consumer devices doing the same on a regular basis, could more effectively predict the existence of a group.

Upon identification of the ad-hoc group of consumer devices, the apparatus 300 includes means, such as communications circuitry 308 or the like, for automatically establishing an ad-hoc network comprising the identified consumer devices. In this regard, the ad-hoc network may comprise a mobile ad hoc network (MANET), such as a smartphone ad hoc network (SPAN) or a vehicular ad hoc network (VAN).

In operation 906, apparatus 300 includes means, such as processor 302 or the like, for determining a group intention associated with the ad-hoc group of consumer devices. In this regard, determining the group intention associated with the ad-hoc group is also based on the contextual data. For instance, determining the group intention associated with the ad-hoc group may, in some embodiments, be based on at least one of environmental indicators or historical information.

In this regard, after detecting a pattern that suggests the existence of an ad-hoc group of consumer devices, the apparatus 300 can utilize the contextual data to determine the activity that the ad-hoc group is likely engaged in. For instance, if there is a likelihood that the consumer devices are associated with individuals that are co-workers that go to eat together, the apparatus 300 may identify the group intention of the ad-hoc group as finding a place to eat.

As another example, consider the situation where two consumers go to the same location every night and then leave every morning. The apparatus 300 may determine that the two consumers are either a couple or roommates, and therefore that they would be susceptible to a group promotion (and this fact may be amplified even more if their buying habits indicate children activities, increasing the likelihood that their group is larger than two adults (i.e., a family). From these determinations, the apparatus 300 may identify particular group intentions associated with the ad-hoc groups (e.g., a desire to purchase household or family supplies). Moreover, over time, the apparatus 300 may measure the number of false positives over time and therefore determine how effective these predictive factors are at identifying ad-hoc groups and/or group intentions.

In operation 908, apparatus 300 includes means, such as communications circuitry 308 or the like, for broadcasting a group promotion request based on the ad-hoc group of consumer devices and the group intention. This group promotion request may include several types of information. As an initial matter, the group promotion request includes a size, location, and group intention of the ad-hoc group. In addition, however, the group promotion request may identify promotion and marketing service accounts of one or more of the consumers associated with consumer devices in the ad-hoc group, so that recipient merchants are able to identify demographic information regarding the constituent members of the ad-hoc group. Additionally or alternatively, the group promotion request may include historical information regarding recent purchases of one or more of the consumers in the ad-hoc group to facilitate better group promotion targeting by merchants receiving the broadcast message.

Optionally, in operation 910, apparatus 300 includes means, such as communications circuitry 308 or the like, for receiving one or more messages from one or more merchants in response to broadcasting the group promotion request. In this regard, each of the one or more messages comprises an impression including an offer to redeem a group promotion at a merchant location associated with at least one of the one or more merchants. This operation is optional because in some circumstances it is conceivable that no merchants are sufficiently nearby to receive the broadcast and/or no merchants are interested in generating responsive group promotions for the ad-hoc group.

Optionally, in operation 912, apparatus 300 may include means, such as processor 302, input/output circuitry 306, communications circuitry 308, or the like, for purchasing a group promotion identified by one of the one or more messages. In this regard, while the group promotion may be received from a merchant, and purchasing of the promotion may similarly be facilitated by the merchant using a merchant terminal. Alternatively, the group promotion may be received from the merchant via the promotion and marketing service, and purchasing the group promotion may be facilitated by the promotion and marketing service.

In some embodiments, prior to purchasing the group promotion, the apparatus 300 may also include means, such as negotiation circuitry 314, for determining a promotion to purchase. In this regard, the negotiation circuitry 314 may enable the apparatus 300 to capture consumer input, such as, for example, by providing a voting interface by which the consumer is able to vote for and/or rank a series of group promotions received from nearby merchants. Similarly, the negotiation circuitry 314 may further utilize communications circuitry 308 to transmit and receive this consumer input and similar consumer input from the other consumer devices in the ad-hoc network. Based on the similar voting and/or ranking received by some or all of the consumer devices in the ad-hoc group of consumer devices, the negotiation circuitry 314 may identify the group promotion to purchase in operation 912.

Furthermore, if a group promotion is purchased, in operation 914 the apparatus 300 may also include means, such as, or the like, for redeeming the group promotion. Redemption will typically occur at a merchant location, although in some embodiments (e.g., ordering delivery food), redemption may occur at a location specified by the ad-hoc group (e.g., specified in the group promotion request broadcast). In any event, redeeming the group promotion may comprise receiving the promotional services (or goods), and paying the merchant a difference between the promotional value and the remainder owed. However, in some embodiments, payment for the redemption may be automated, in which case redemption may comprise receiving the promotional services (or goods), followed by receiving an indication that payment of a portion of the group promotion owed by a consumer associated with the consumer device has been debited from an account associated with the consumer.

Example Operations Performed by a Merchant Device

Turning now to FIG. 10, a flowchart illustrates a series of operations performed by a merchant device to receive a group promotion request and optionally design, transmit, and facilitate redemption of a group promotion responsive to the group promotion request, in accordance with example embodiments described herein. The operations illustrated in FIG. 10 may, for example, be performed by a merchant device 112, with the assistance of, and/or under the control of an apparatus 400.

In operation 1002, apparatus 400 includes means, such as communications device 408 or the like, for receiving a group promotion request from an ad-hoc group of consumer devices.

In operation 1004, apparatus 400 includes means, such as processor 402, memory 404, yield management circuitry 410, or the like, for retrieving yield management information. As noted previously, this yield management information may include the merchant's fixed, perishable resources (e.g., in a restaurant environment, table availability, inventory, specials available, or the like).

In operation 1006, apparatus 400 includes means, such as processor 402, yield management circuitry 410, or the like, for evaluating the yield management information based on the group promotion request. This evaluation may include determining whether sufficient capacity exists to accommodate a number of consumers identified by the ad-hoc group of consumer devices. In some scenarios, sufficient capacity may not exist. In those cases, the procedure ends. Otherwise, the procedure may advance to optional operation 1008.

In operation 1008, apparatus 400 includes means, such as processor 402, promotion design circuitry 412, or the like, for designing a group promotion based on the group promotion request and the evaluation of the yield management information. In this regard, designing the group promotion may comprise determining a number of consumers identified by the ad-hoc group of consumer devices, and then selecting a predefined promotion based on a comparison of the number of consumers identified by the ad-hoc group of consumer devices to stored predetermined promotion thresholds.

If the apparatus 400 designs a promotion, in operation 1010, apparatus 400 includes means, such as communications interface 408 or the like, for transmitting a message including an offer of a group promotion. This message may be transmitted to any or all of the consumer devices in the ad-hoc group of consumer devices.

If the group promotion is selected by the ad-hoc group of consumer devices, then in operation 1012, the apparatus 400 may include means, such as communications circuitry 408 or the like, for receiving an indication that the ad-hoc group of consumer devices purchased the group promotion. This indication may be received directly from one of the consumer devices, or alternatively may be received via the promotion and marketing service.

Furthermore, if a group promotion is purchased, in operation 1014 the apparatus 400 may also include means, such as processor 402, or the like, for facilitating redemption of the group promotion. In some embodiments, this facilitation includes debiting accounts associated with the consumer devices in the ad-hoc group of consumer devices, and transmitting a message to each consumer device in the ad-hoc group of consumer devices, the message indicating that payment of a portion of the group promotion owed by a consumer associated with the consumer device has been debited from an account associated with the consumer.

Example Operations Performed by the Promotion and Marketing Service

Turning now to FIG. 11, a flowchart illustrates a series of operations performed by a promotion and marketing service to receive a group promotion request and optionally design, transmit, and facilitate redemption of a group promotion responsive to the group promotion request, in accordance with example embodiments described herein. The operations illustrated in FIG. 11 may, for example, be performed by a promotion and marketing service 102, with the assistance of, and/or under the control of an apparatus 500.

In operation 1102, apparatus 500 includes means, such as communications circuitry 508 or the like, for determining whether to collect contextual data. As noted above in connection with FIG. 9, the consumer device 300 may collect contextual data, so in some situations, separate collection of contextual data may not be necessary. Accordingly, in some embodiments, it may be determined that the apparatus 500 should not collect contextual data, in which case the procedure advances to operation 1116. Alternatively, in some situations (e.g., when consumer devices 300 are in a relatively scattered arrangement), collection, by the promotion and marketing service, of contextual data, may enable collection of contextual data regarding a larger number of consumer devices, which may lead to the uncovering of ad-hoc groups of consumer devices that otherwise would not be spotted. In such situations, the procedure advances to operation 1104.

In operation 1104, apparatus 500 includes means, such as communications circuitry 508, context collection circuitry 510, or the like, for collecting contextual data from a plurality of consumer devices. The contextual data comprises the same data described as being collected in FIG. 9 by a consumer device. However, in embodiments discussed with respect to FIG. 11, because the contextual data for all consumer devices may be collected by the promotion and marketing service, the consumer devices are relieved of a need to transmit and receive information from other consumer devices. Accordingly, these embodiments may reduce the processing power required by the consumer devices.

In operation 1106, apparatus 500 includes means, such as processor 502, group identification circuitry 512, or the like, for identifying, based on the collected contextual data, an ad-hoc group of consumer devices. This operation occurs in a substantially similar fashion as operation 904, described above in connection with FIG. 9. However, while operation 904 identifies a single ad-hoc group of consumer devices including a particular consumer device, operation 1106 may enable the identification of numerous ad-hoc groups between several sets of consumer devices.

In operation 1108, apparatus 500 includes means, such as or the like, for determining a group intention associated with each identified ad-hoc group of consumer devices. Operation 1108 occurs in similar fashion as operation 906, described above in connection with FIG. 9. However, as with operation 1106, operation 1108 may identify group intentions for each identified ad-hoc group, rather than (as in operation 906) only for a single ad-hoc group of consumer devices.

In operation 1110, apparatus 500 includes means, such as processor 502, communications circuitry 508, or the like, for identifying relevant merchants based on identification of the ad-hoc group of consumer devices and the group intention. In this regard, while consumer device 300 can broadcast a group promotion request to all local merchants, the promotion and marketing service may not be located near the consumer devices comprising each ad-hoc group or near merchants that may be responsive to the ad-hoc group. Accordingly, the promotion and marketing service must identify the merchants that are proximate to the ad-hoc group of consumer devices.

Subsequently, in operation 1112 apparatus 500 include means, such as processor 502 or the like, for determining whether the server should generate group promotions on behalf of the relevant merchants. In this regard, some merchants may utilize merchant devices 400 capable of automatically generating group promotions. However, others may not. Accordingly, once the relevant merchants have been identified, the promotion and marketing service determines whether to generate group promotions on behalf of the relevant merchants. This may comprise, for instance, querying memory 504 for stored information regarding the capabilities of the merchant devices 400, or alternatively querying the merchant devices 400 directly to determine whether they are capable of automatically generating group promotions. If the promotion and marketing service determines that it should generate group promotions on behalf of the relevant merchants, the procedure advances to operation 1120. If not, the procedure advances to operation 1114.

Accordingly, in operation 1114, the apparatus 500 includes means, such as communications circuitry 508 or the like, for transmitting a group promotion request to the relevant merchant devices. This transmission thus provides the merchant devices with the information necessary to automatically generate group promotions (or not) on their own and without needing to utilize the promotion and marketing service. Subsequently, the procedure may advance to operation 1126, described below.

Turning now to operation 1116 (which is reached from operation 1102 if it is determined that the promotion and marketing service should not identify ad-hoc groups of consumer devices), the apparatus 500 includes means, such as processor 502 or the like, for determining whether the server should generate group promotions on behalf of the relevant merchants. It should be understood that operation 1116 need only reached upon receipt of a group promotion request (e.g., a request received from a consumer device that is a member of an ad-hoc group and described above in connection with operation 908). Like operation 1112 described above, in operation 1116 the promotion and marketing service determines whether it should generate group promotions on behalf of the relevant merchants. If not, the procedure advances to optional operation 1126, described below. If so, then the procedure advances to operation 1118.

In operation 1118, apparatus 500 includes means, such as processor 502 or the like, for identifying relevant merchants. This operation is similar to operation 1114 described above. However, rather than identifying relevant merchants based on an ad-hoc group identified by the promotion and marketing service, in operation 1118 the ad-hoc group will have been identified separately by one or more consumer devices. Accordingly, identifying relevant merchants first requires receipt, from the identified ad-hoc group, of a group promotion request from the ad-hoc group of consumer devices.

In operation 1120, apparatus 500 includes means, such as processor 502 or the like, for evaluating the yield management information for each of the relevant merchants based on the group promotion request. This operation is similar to operation 1006 described above in connection with FIG. 10, except that operation 1120 may evaluate yield management information of all relevant merchants, rather than just a single merchant.

In operation 1122, apparatus 500 includes means, such as processor 502, promotion design circuitry 514, or the like, for designing group promotions for a subset of the relevant merchants based on the group promotion request and the evaluations of the yield management information for each of the relevant merchants. This operation is similar to operation 1008 described above in connection with FIG. 10, except that, as with operation 1120, operation 1122 may design group promotions for more than one merchant.

In operation 1124, apparatus 500 includes means, such as communications circuitry 508 or the like, for transmitting messages including offers of group promotions on behalf of the subset of the relevant merchants. These messages may be transmitted to all consumer devices within the vicinity of the subset of the relevant merchants, or alternatively these messages may be transmitted only to the consumer devices in the ad-hoc group of consumer devices located near each merchant of the subset of the relevant merchants.

Optionally, in operation 1126, apparatus 500 includes means, such as or the like, for facilitating redemption of the purchased group promotion. In this regard, apparatus 500 may include means, such as communications circuitry 508 or the like, for receiving a request to purchase one of the group promotions from a consumer device in the ad-hoc group of consumer devices. Subsequently, the apparatus 500 may provide fulfillment data to a subset of the ad-hoc group of consumer devices or may provide compensation data to the merchant that is the party to the redeemed promotion. This operation is optional because there remains a chance that none of the merchant devices will transmit group promotions, or even if they do, there is a chance that the ad-hoc consumer group would not purchase one of the transmitted group promotions.

FIGS. 9-11 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Example Scenario 1: The Work Lunch

Consider the following example scenario, employing an example embodiment of the present invention. Several employees are having a workshop at the office. When it becomes lunchtime, they all decide to step-out together while continuing conversation. As they walk into the street searching for a food venues where to continue their impromptu off-site meeting, their phones of the employees detect the promotion and marketing service accounts of each other, moving in near proximity for more than a few minutes, in the same direction, during lunchtime. The networked apps stored on the phones seamlessly pair in a mesh, and negotiate an aggregated broadcast to all listening merchant devices in the area: "We are a team of 7, roaming this very moment for a table, and a good deal."

Local merchant terminals, aware of the yield management information regarding their respective merchants, may generate group promotions in response to receipt of the aggregated broadcast message. The group promotions are generated based on the respective merchants' preconfigured promotion thresholds. Subsequently, the merchant terminals transmit a notification message back to the ad-hoc group: "Group of 7? We have a table with a 15% meal discount if you show up in the next 30 minutes".

Example Scenario 2: The Family Expedition

Amir has a family of six: four infants of different ages and his wife Maria. Whenever looking for provisioning, meals or entertainment, he is only interested in deals that take quantity and family-sized value into account. His promotion and marketing service membership is pre-configured with an x5 "Group-is-ON" score, to take into account his number of dependents. When driving near town, his phone detects his wife's phone nearby and establishes an ad-hoc network that determines a likelihood that their common dependents are nearby is high, and automatically broadcasts: "We are a family of 6 looking for things to do".

Upon analysis of contextual data detecting that Amir's phone is traveling at a speed most likely correlated with a vehicle, his phone automatically widens its broadcast perimeter to regions forward in a 30-min driving distance. The local zoo (a local merchant) receives the automatically-generated request and instantly replies with a 25% off on tickets for families that day. Meanwhile, the merchant terminal at a nearby ice-cream store also receives the request and offers a 15% discount when purchasing five ice creams or more.

As described above, certain example embodiments of the present invention are directed to improved apparatuses, methods, and computer readable media that enable automatic identification of ad-hoc groups by consumer devices. Based on the identification of this ad-hoc group and the identification of a group intention, consumer devices in the ad-hoc group may automatically broadcast group promotion requests. Local merchants that receive these broadcasts can then automatically evaluate local yield management information and possibly develop responsive group promotions that offer benefits to both the ad-hoc group and the merchants themselves.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
    context collection circuitry configured to collect contextual data of a first consumer device, wherein the contextual data include information about a physical context of the first consumer device, wherein the contextual data comprises data received from one or more sensors associated with the first consumer device;
    location identification circuitry configured to identify a consumer device location of the first consumer device based on the collected contextual data;
    secondary attribute identification circuitry configured to identify a secondary attribute of the first consumer device based on the collected contextual data, wherein the secondary attribute comprises at least calculated data regarding a mode of travel;
    communications circuitry configured to receive signals directly from other consumer devices, wherein the signals comprise contextual data associated with each of the other consumer devices, wherein the contextual data associated with each of the other consumer devices identifies a location and identifies a secondary attribute, wherein the second attribute comprises at least calculated data regarding a mode of travel of the other consumer device;
    group identification circuitry configured to identify an ad-hoc group of consumer devices based on the identified consumer device locations of the first consumer device and of the other consumer devices and the calculated data regarding the mode of travel of the first consumer device and the other consumer devices;
    a processor configured to determine a group intention associated with the ad-hoc group of consumer devices;
    the communications circuitry further configured to determine an initial broadcast perimeter associated with the first consumer device and the group intention based on at least the identification of the ad-hoc group of consumer devices;
    the communications circuitry further configured to adjust the initial broadcast perimeter associated with the first consumer device based on at least the calculated data regarding the mode of travel; and
    the communications circuitry further configured to broadcast a group promotion request to one or more merchants within the adjusted broadcast perimeter based on the ad-hoc group of consumer devices and the group intention.

2. The apparatus of claim 1, wherein the communications circuitry is further configured to:
    receive one or more messages from one or more merchants in response to broadcasting the group promotion request,
    wherein each of the one or more messages comprises an offer to redeem a group promotion at a merchant location associated with at least one of the one or more merchants.

3. The apparatus of claim 2, wherein the processor is further configured to:
    purchase a group promotion identified by one of the one or more messages.

4. The apparatus of claim 3, wherein the communications circuitry is further configured to:
    redeem the group promotion.

5. The apparatus of claim 1, wherein collecting the contextual data comprises capturing, by sensors controlled by the consumer device, one or more of location data, velocity data, acceleration data, data identifying a direction-of-travel of the consumer device, gyroscopic data, temperature data, humidity data, brightness data, gravitational data, orientation data, proximity data, and audio data.

6. The apparatus of claim 1, wherein collecting the contextual data further comprises identifying distances between the consumer device and the other consumer devices.

7. The apparatus of claim 1, wherein identifying the ad-hoc group of consumer devices comprises:
    identifying, based on the contextual data and the consumer device location of the first consumer device, a first set of consumer devices, wherein the first set of consumer devices comprise one or more consumer devices of the other consumer devices within a predetermined distance of the first consumer device; and
    wherein the ad-hoc group of consumer devices comprises the first consumer device and one or more consumer devices from the first set of consumer devices.

8. The apparatus of claim 7, wherein the secondary attribute further comprises a direction of travel; and wherein the ad-hoc group of consumer devices excludes consumer devices from the first set that do not have a similar direction-of-travel as the first consumer device.

9. The apparatus of claim 7, wherein identifying the ad-hoc group of consumer devices comprises:
    retrieving, based on the contextual data of the first consumer device, historical information regarding the first consumer device and each consumer device in the first set of consumer devices; and
    identifying, based on the historical information regarding the first consumer device and the historical information regarding each consumer device in the first set of consumer devices, one or more consumer devices in the first set of consumer devices having similar purchasing patterns as the consumer device,
    wherein the ad-hoc group of consumer devices excludes consumer devices from the first set of consumer devices that do not have similar historical purchasing patterns.

10. The apparatus of claim 1, wherein determining the group intention associated with the ad-hoc group is based on the identified consumer device location and the identified secondary attribute of the first consumer device.

11. The apparatus of claim 10, wherein determining the group intention associated with the ad-hoc group is further based on at least one of environmental indicators or historical information.

12. The apparatus of claim 1, wherein the secondary attribute is further comprises a direction of travel of the first consumer device.

13. The apparatus of claim 1, wherein identifying an ad-hoc group of consumer devices comprises:
   identifying a second set of consumer devices based on the identified consumer device location of the first consumer device, wherein the second set of consumer devices comprises consumer devices within a predetermined distance of the consumer device; and
   selecting one or more of the second set of consumer devices for membership in the ad-hoc group of consumer devices based on the identified secondary attribute of the consumer device.

14. The apparatus of claim 1, wherein adjusting the initial broadcast perimeter is in response to the first consumer device determining to adjust the initial broadcast perimeter.

15. A method comprising:
   collecting, by a first consumer device, contextual data of a first consumer device, wherein the contextual data include information about a physical context of the first consumer device, wherein the contextual data comprises data received from one or more sensors associated with the consumer device;
   identifying, by the first consumer device and based on the collected contextual data, a consumer device location of the first consumer device and a secondary attribute of the first consumer device, wherein the secondary attribute comprises at least calculated data regarding a mode of travel;
   receiving signals directly from other consumer devices, wherein the signals comprise contextual data associated with each of the other consumer devices, wherein the contextual data associated with each of the other consumer devices identifies a location and identifies a secondary attribute, wherein the second attribute comprises at least calculated data regarding a mode of travel of the other consumer device;
   identifying, by the first consumer device and based on the identified consumer device locations of the first consumer device and of the other consumer devices and the calculated data regarding the mode of travel of the first consumer device and the other consumer devices, an ad-hoc group of consumer devices;
   determining a group intention associated with the ad-hoc group of consumer devices;
   determining an initial broadcast perimeter associated with the first consumer device and the group intention based on at least the identification of the ad-hoc group of consumer devices;
   adjusting the initial broadcast perimeter associated with the first consumer device based on at least the calculated data regarding the mode of travel; and
   broadcasting a group promotion request to one or more merchants within the adjusted broadcast perimeter based on the ad-hoc group of consumer devices and the group intention.

16. The method of claim 15, further comprising:
   receiving one or more messages from one or more merchants in response to broadcasting the group promotion request,
   wherein each of the one or more messages comprises an offer to redeem a group promotion at a merchant location associated with at least one of the one or more merchants.

17. The method of claim 16, further comprising:
   purchasing a group promotion identified by one of the one or more messages.

18. The method of claim 17, further comprising:
   redeeming the group promotion.

19. The method of claim 15, wherein identifying the ad-hoc group of consumer devices comprises:
   identifying, based on the contextual data and the consumer device location of the first consumer device, a first set of consumer devices, wherein the first set of consumer devices comprise one or more consumer devices of the other consumer devices within a predetermined distance of the first consumer device,
   wherein the ad-hoc group of consumer devices comprises the first consumer device and one or more consumer devices from the first set of consumer devices.

20. The method of claim 19, wherein the secondary attribute further comprises a direction of travel, wherein the ad-hoc group of consumer devices excludes consumer devices from the first set that do not have a similar direction-of-travel as the first consumer device.

21. The method of claim 19, wherein identifying the ad-hoc group of consumer devices comprises:
   retrieving, based on the contextual data, historical information regarding the first consumer device and each consumer device in the first set of consumer devices; and
   identifying, based on the historical information regarding the first consumer device and the historical information regarding each consumer device in the first set of consumer devices, one or more consumer devices in the first set of consumer devices having similar purchasing patterns as the consumer device,
   wherein the ad-hoc group of consumer devices excludes consumer devices from the first set of consumer devices that do not have similar historical purchasing patterns.

22. The method of claim 15, wherein the secondary attribute further comprises a direction of travel of the first consumer device.

23. The method of claim 15, wherein identifying an ad-hoc group of consumer devices comprises:
   identifying a second set of consumer devices based on the identified consumer device location of the first consumer device, wherein the second set of consumer devices comprises consumer devices within a predetermined distance of the consumer device; and
   selecting one or more of the second set of consumer devices for membership in the ad-hoc group of consumer.

24. The method of claim 15, wherein adjusting the initial broadcast perimeter is in response to the first consumer device determining to adjust the initial broadcast perimeter.

25. The method of claim 15, wherein broadcasting the group promotion request to one or more merchants within the adjusted broadcast perimeter based on the ad-hoc group of consumer devices and the group intention is directly broadcast to one or more merchants from the first consumer device.

26. A first consumer device comprising:
   means for collecting contextual data of a first consumer device, wherein the contextual data include information about a physical context of the first consumer device, wherein the contextual data comprises data received from one or more sensors associated with the first consumer device;

means for identifying a consumer device location of the first consumer device based on the collected contextual data;

means for identifying a secondary attribute of the first consumer device based on the collected contextual data, wherein the secondary attribute comprises at least calculated data regarding a mode of travel;

means for receiving signals directly from other consumer devices, wherein the signals comprise contextual data associated with each of the other consumer devices, wherein the contextual data associated with each of the other consumer devices identifies a location and identifies a secondary attribute, wherein the second attribute comprises at least calculated data regarding a mode of travel of the other consumer device;

means for identifying, based on the identified consumer device locations of the first consumer device and of the other consumer devices and the calculated data regarding the mode of travel of the first consumer device and the other consumer devices, an ad-hoc group of consumer devices;

means for determining a group intention associated with the ad-hoc group of consumer devices;

means for determining an initial broadcast perimeter associated with the first consumer device and the group intention based on at least the identification of the ad-hoc group of consumer devices;

means for adjusting the initial broadcast perimeter associated with the first consumer device based on at least the calculated data regarding the mode of travel; and means for broadcasting a group promotion request to one or more merchants within the adjusted broadcast perimeter based on the ad-hoc group of consumer devices and the group intention.

27. The consumer device of claim 26, further comprising:

means for receiving one or more messages from one or more merchants in response to broadcasting the group promotion request, wherein each of the one or more messages comprises an offer to redeem a group promotion at a merchant location associated with at least one of the one or more merchants.

28. The consumer device of claim 27, further comprising:

means for purchasing a group promotion identified by one of the one or more messages.

29. The consumer device of claim 28, further comprising: means for redeeming the group promotion.

30. The consumer device of claim 26, wherein the means for identifying the ad-hoc group of consumer devices comprises:

means for identifying, based on the contextual data and the consumer device location of the first consumer device, a first set of consumer devices, wherein the first set of consumer devices comprise one or more consumer devices of the other consumer devices within a predetermined distance of the first consumer device, wherein the ad-hoc group of consumer devices comprises the first consumer device and one or more consumer devices from the first set of consumer devices.

31. The consumer device of claim 30, wherein the secondary attribute further comprises a direction of travel, wherein the ad-hoc group of consumer devices excludes consumer devices from the first set that do not have a similar direction-of-travel as the first consumer device.

32. The consumer device of claim 30, wherein the means for identifying the ad-hoc group of consumer devices comprises:

means for retrieving, based on the contextual data, historical information regarding the first consumer device and each consumer device in the first set of consumer devices; and means for identifying, based on the historical information regarding the first consumer device and the historical information regarding each consumer device in the first set of consumer devices, one or more consumer devices in the first set of consumer devices having similar purchasing patterns as the consumer device, wherein the ad-hoc group of consumer devices excludes consumer devices from the first set of consumer devices that do not have similar historical purchasing patterns.

33. The consumer device of claim 26, wherein the secondary attribute further comprises a direction of travel of the first consumer device.

34. The consumer device of claim 26, wherein identifying an ad-hoc group of consumer devices comprises:

identifying a second set of consumer devices based on the identified consumer device location of the first consumer device, wherein the second set of consumer devices comprises consumer devices within a predetermined distance of the consumer device; and selecting one or more of the second set of consumer devices for membership in the ad-hoc group of consumer.

35. The consumer device of claim 26, wherein adjusting the initial broadcast perimeter is in response to the consumer device determining to adjust the initial broadcast perimeter.

36. The consumer device of claim 26, wherein the means for broadcasting the group promotion request to one or more merchants within the adjusted broadcast perimeter based on the ad-hoc group of consumer devices and the group intention directly broadcasts to one or more merchants from the first consumer device.

* * * * *